US011359959B2

(12) United States Patent
Brame (10) Patent No.: US 11,359,959 B2
(45) Date of Patent: Jun. 14, 2022

(54) WIRELESS SCALE ASSEMBLY

(71) Applicant: Lauren Brame, Amaheim Hills, CA (US)

(72) Inventor: Lauren Brame, Amaheim Hills, CA (US)

( * ) Notice: Subject to any disclaimer, the term of this patent is extended or adjusted under 35 U.S.C. 154(b) by 0 days.

(21) Appl. No.: 16/942,976

(22) Filed: Jul. 30, 2020

(65) Prior Publication Data

US 2022/0034707 A1     Feb. 3, 2022

(51) Int. Cl.
*G01G 23/42*     (2006.01)
*G01G 19/44*     (2006.01)
*G01G 19/52*     (2006.01)

(52) U.S. Cl.
CPC ............ *G01G 23/42* (2013.01); *G01G 19/44* (2013.01); *G01G 19/52* (2013.01)

(58) Field of Classification Search
CPC ......... G01G 19/44; G01G 19/52; G01G 23/42
See application file for complete search history.

(56) References Cited

U.S. PATENT DOCUMENTS

| | | | | |
|---|---|---|---|---|
| 4,969,112 A * | 11/1990 | Castle | .................. | G01G 19/025 177/136 |
| 6,781,067 B2 * | 8/2004 | Montagnino | .......... | G01G 19/44 177/142 |
| 6,875,932 B2 * | 4/2005 | Tuft | ....................... | G01G 19/44 177/144 |
| 6,919,516 B2 * | 7/2005 | Frye | ..................... | G01G 3/1408 177/132 |
| 7,084,357 B2 * | 8/2006 | Roberts | .................. | A45C 15/00 177/131 |
| 7,358,449 B2 | 4/2008 | Hannon | | |
| 7,550,684 B2 | 6/2009 | Kritzler | | |
| 8,698,014 B1 * | 4/2014 | Walstad | ................. | G01G 19/44 177/126 |
| 8,901,442 B1 | 12/2014 | Dilone | | |
| 9,804,018 B1 * | 10/2017 | Muccillo | ................ | G01G 19/58 |
| 10,039,362 B2 | 8/2018 | O'Hara | | |
| 10,260,934 B2 | 4/2019 | Esmail | | |
| 10,670,451 B2 * | 6/2020 | Dixon, Jr. | .............. | B65D 25/02 |
| 2010/0181119 A1 * | 7/2010 | Saigh | ...................... | G01G 21/22 177/127 |
| 2013/0220708 A1 * | 8/2013 | Kim | .................... | G01G 23/3735 177/3 |
| 2014/0196960 A1 * | 7/2014 | Rothkegel | ................. | B66F 7/28 177/132 |
| 2014/0318874 A1 * | 10/2014 | Moses | .................... | G01G 19/56 177/1 |
| 2016/0231166 A1 | 8/2016 | Malhotra | | |
| 2018/0116361 A1 | 5/2018 | Anjum | | |

FOREIGN PATENT DOCUMENTS

WO    WO2018087636     5/2018

* cited by examiner

*Primary Examiner* — Randy W Gibson (57) ABSTRACT

A wireless scale assembly for weighing an object in any location includes a plurality of load cells that is each positionable beneath an object to be weighed. In this way each of the load cells can measure the weight of the object. A processing unit is in electrical communication with each of the load cells thereby facilitating the processing unit receive weight data from each of the load cells. The processing unit is in wireless communication with an extrinsic electronic device thereby facilitating the extrinsic electronic device to store the weight data. In this way the extrinsic electronic device facilitates a user to read the weight recorded by each of the load cells.

6 Claims, 7 Drawing Sheets

WIRELESS SCALE ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to scale devices and more particularly pertains to a new scale device for weighing an object in any location.

(2) Description of Related Art Including Information Disclosed Under 37 CFR 1.97 and 1.98

The prior art relates to scale devices including a weight sensing device that is held in a user's hand and that measures the weight of an object that is carried by the user. The prior art discloses a hand held scale for measuring the weight of luggage. The prior art discloses a variety of devices that include an article of luggage which has a weight sensing device integrated therein for determined the weight of the article of luggage. The prior art discloses a plurality of electronic scales, each in wireless communication with a remote display, for weighing an object and displaying the determined weight on the remote display.

BRIEF SUMMARY OF THE INVENTION

An embodiment of the disclosure meets the needs presented above by generally comprising a plurality of load cells that is each positionable beneath an object to be weighed. In this way each of the load cells can measure the weight of the object. A processing unit is in electrical communication with each of the load cells thereby facilitating the processing unit receive weight data from each of the load cells. The processing unit is in wireless communication with an extrinsic electronic device thereby facilitating the extrinsic electronic device to store the weight data. In this way the extrinsic electronic device facilitates a user to read the weight recorded by each of the load cells.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

With reference now to the drawings, and in particular to FIGS. 1 through 8 thereof, a new scale device embodying the principles and concepts of an embodiment of the disclosure and generally designated by the reference numeral 10 will be described.

As best illustrated in FIGS. 1 through 8, the wireless scale assembly 10 generally comprises a plurality of load cells 12 that is each of the load cells 12 is positionable beneath an object 14 to be weighed for measuring the weight of the object 14. Each of the load cells 12 has a top wall 16, a bottom wall 18 and a perimeter wall 20 extending therebetween, and the perimeter wall 20 is continuously arcuate about a center point of the top wall 16 such that each of the load cells 12 has a disk shape. The bottom wall 18 of each of load cells 12 is positionable on a support surface 22 thereby facilitating the top wall 16 to have the object 14 positioned thereon. Moreover, the top wall 16 of each of the load cells 12 is movable with respect to the perimeter wall 20 such that the top wall 16 of each of load cells 12 is displaced by the weight of the object 14. Each of the load cells 12 may comprise electronic load cells 12 that have a sensitivity ranging between approximately 0.5 kg and 250.0 kg.

Figure 3:
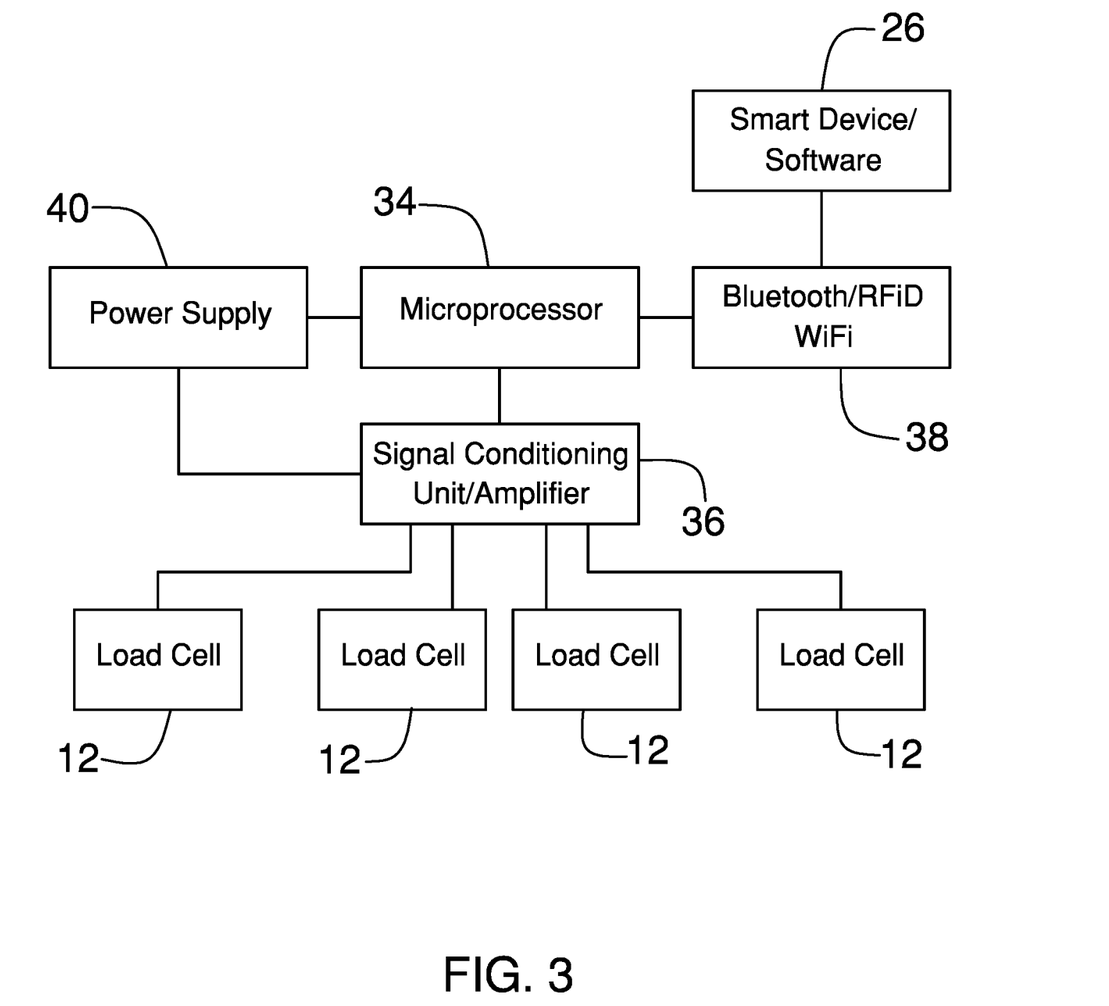
FIG. 3 is a schematic view of an embodiment of the disclosure.
Figure 4:
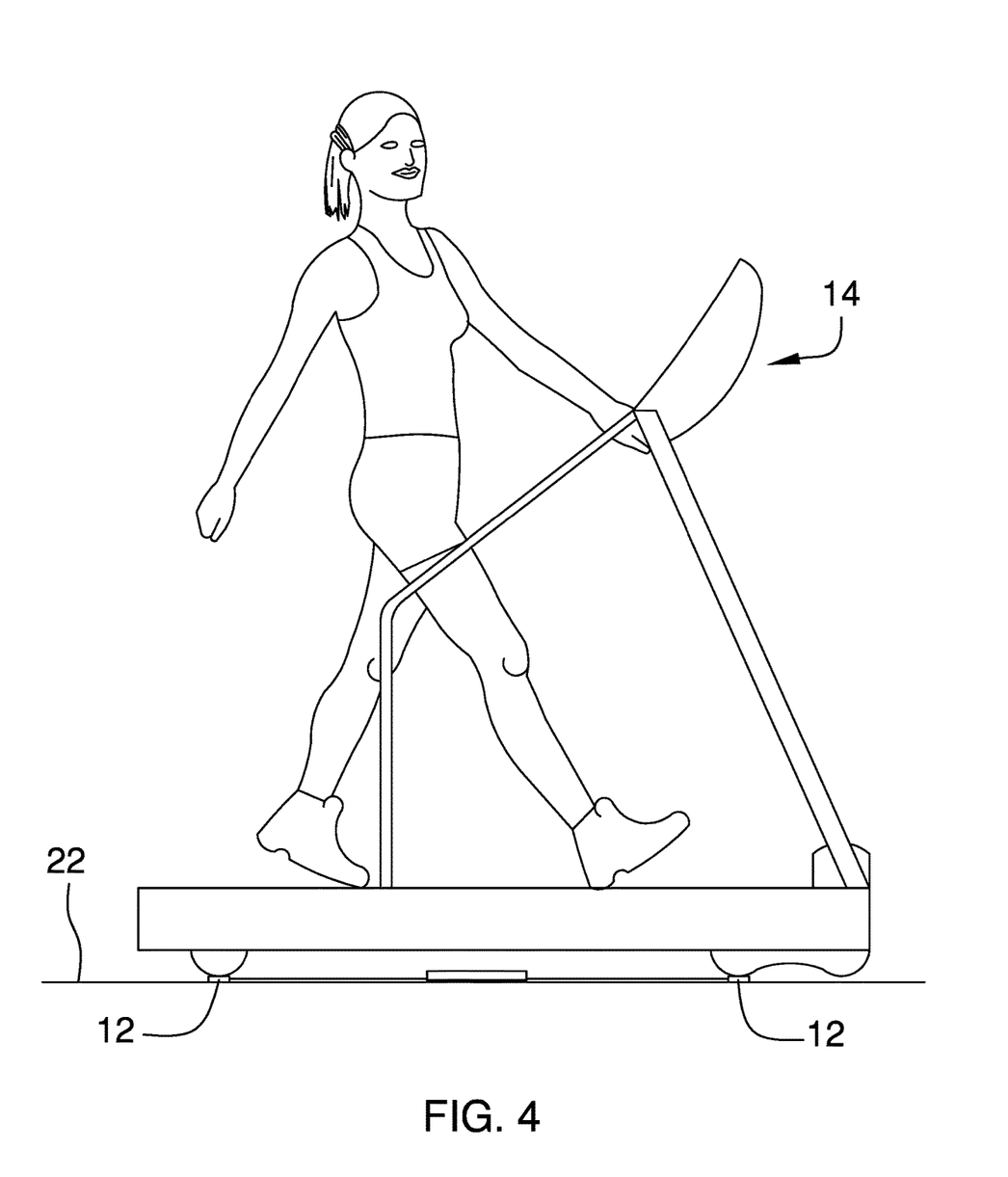
FIG. 4 is a right side in-use view of an embodiment of the disclosure.
Figure 5:
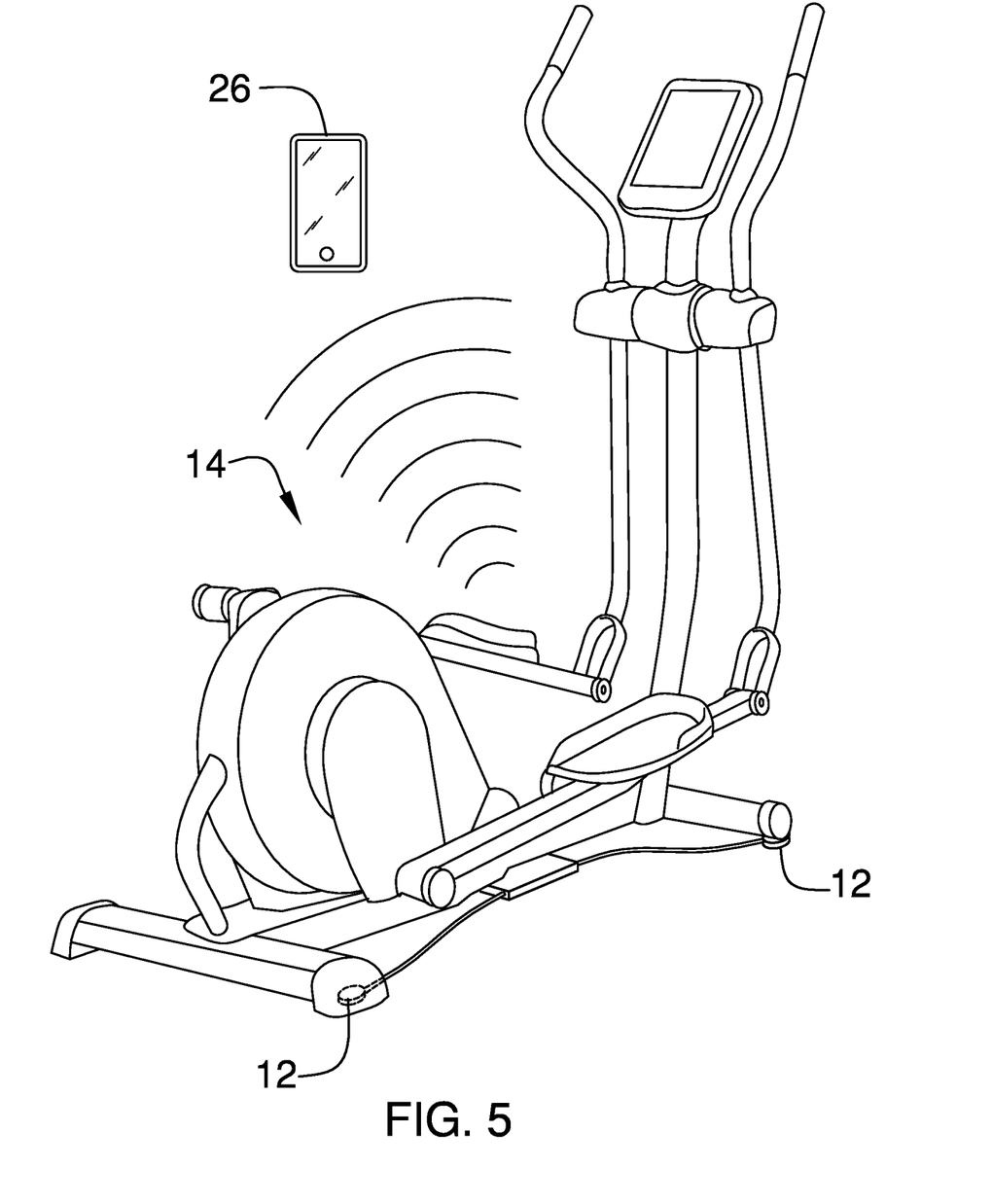
FIG. 5 is a back perspective in-use view of an embodiment of the disclosure.
Figure 6:
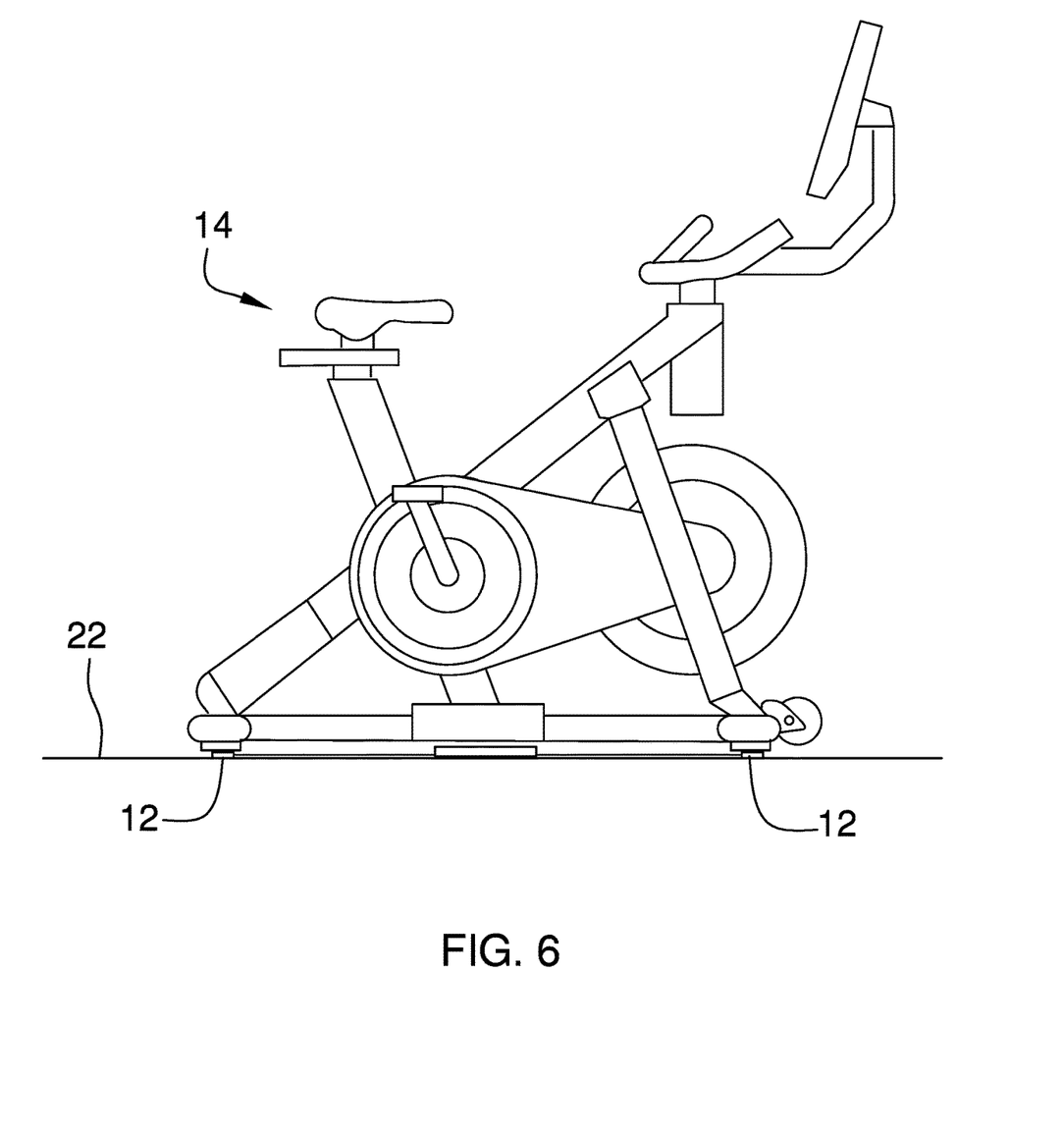
FIG. 6 is a perspective in-use view of an embodiment of the disclosure.
Figure 7:
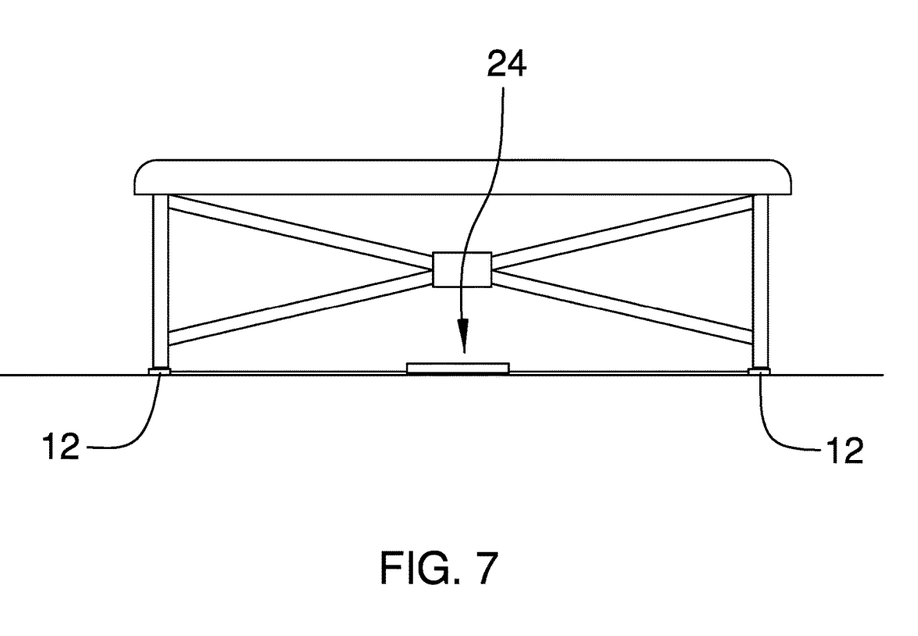
FIG. 7 is a phantom in-use view of an embodiment of the disclosure.
Figure 8:
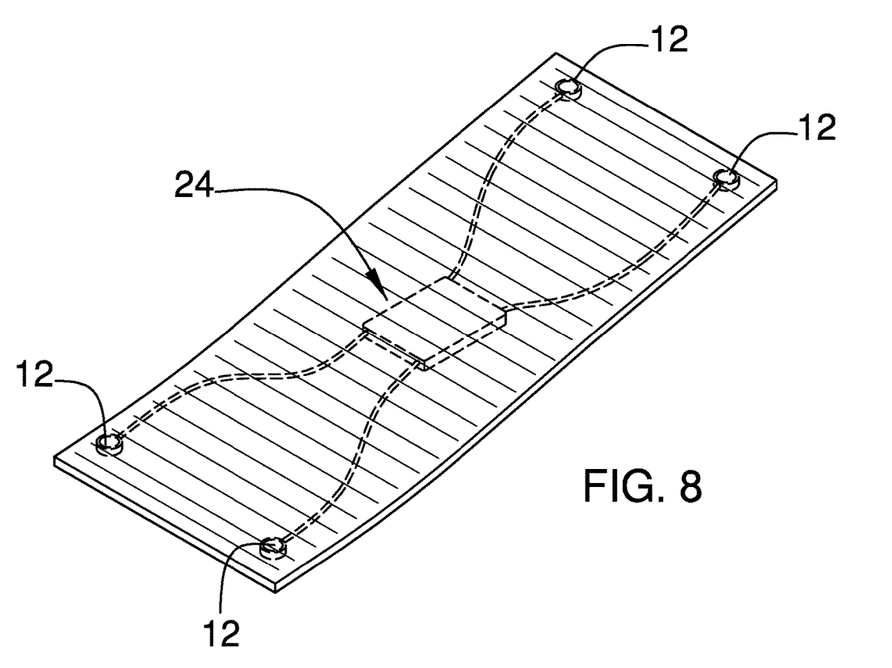
FIG. 8 is a front in-use view of an embodiment of the disclosure.

A processing unit 24 is provided and the processing unit 24 is in electrical communication with each of the load cells 12 for receiving weight data from each of the load cells 12. Additionally, the processing unit 24 is remotely positioned with respect to each of the load cells 12. The processing unit 24 is in wireless communication with an extrinsic electronic device 26. In this way the processing unit 24 can communicate the weight data to the extrinsic electronic device 26 thereby facilitating the extrinsic electronic device 26 to store the weight data. Thus, the extrinsic electronic device 26 facilitates a user to read the weight recorded by each of the load cells 12. The extrinsic electronic device 26 may comprise a smart phone, a personal computer or other similar device that has wireless communication capabilities, such as Bluetooth or the like.

The processing unit 24 comprises a housing 28 that has a front wall 30 and a back wall 32. A control circuit 34 is positioned within the housing 28 and the control circuit 34 is in electrical communication with each of the load cells 12. A signal analyzer 36 is positioned within the housing 28 and the signal analyzer 36 is electrically coupled to the control circuit 34. Moreover, the signal analyzer 36 receives the weight data from each of the load cells 12 thereby facilitating the signal analyzer 36 to analyze the weight data from each of the load cells 12. In this way the signal analyzer 36 can determine the weight of the object 14 positioned on the load cells 12.

The processing unit 24 includes a transceiver 38 that is positioned within the housing 28. The transceiver 38 is electrically coupled to the control circuit 34 and the transceiver 38 is in wireless communication with the extrinsic electronic device 26. The transceiver 38 broadcasts the weight determined by the signal analyzer 36 to the extrinsic electronic device 26 for communicating the weight to the user. The transceiver 38 may comprise a radio frequency transceiver or the like and the transceiver 38 may employ Bluetooth communication protocols. The processing unit 24 includes a power supply 40 that is positioned in the housing 28, the power supply 40 is electrically coupled to the control circuit 34 and the power supply 40 comprises at least one battery.

Figure 1:
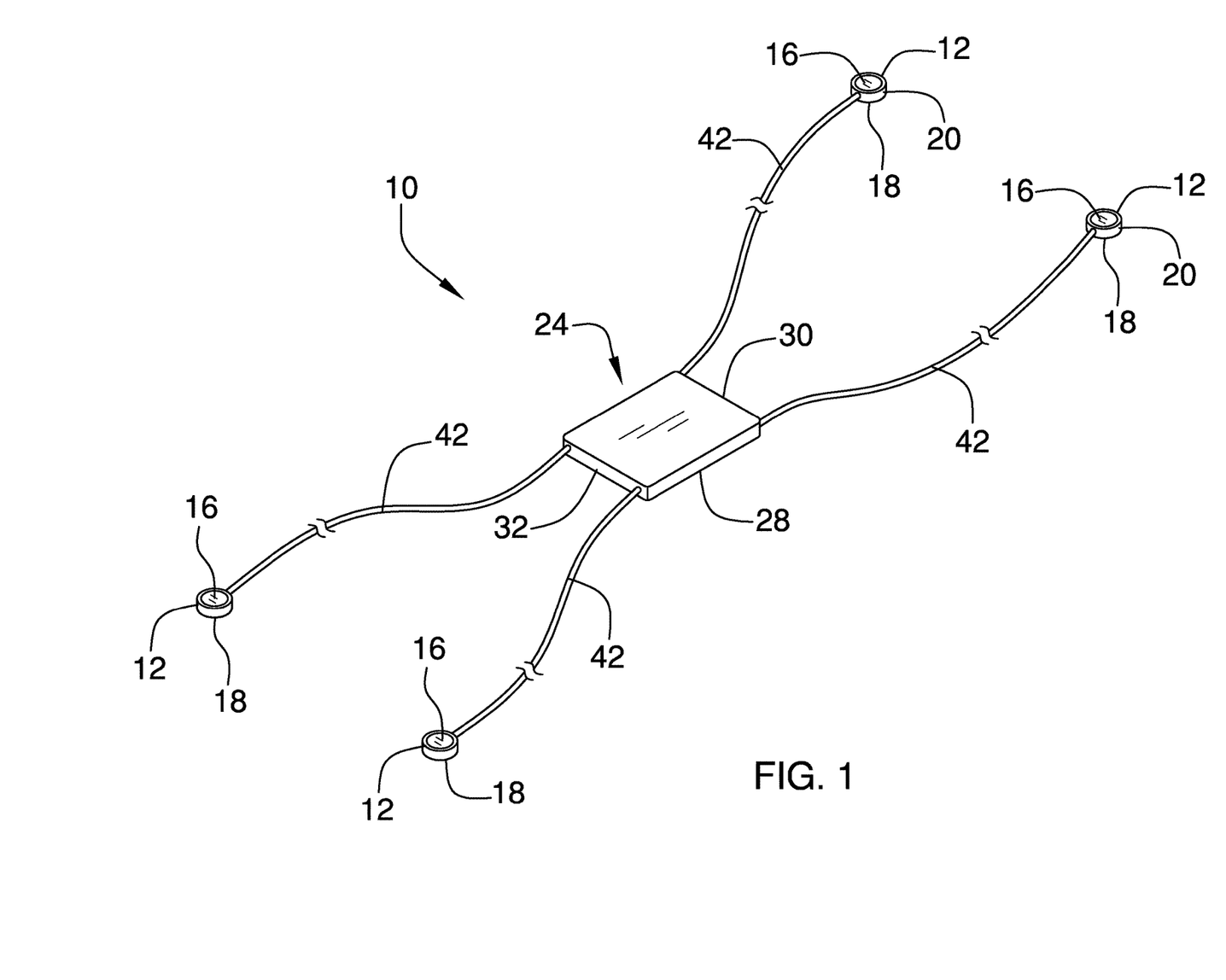
FIG. 1 is a top perspective view of a wireless scale assembly according to an embodiment of the disclosure.
Figure 2:
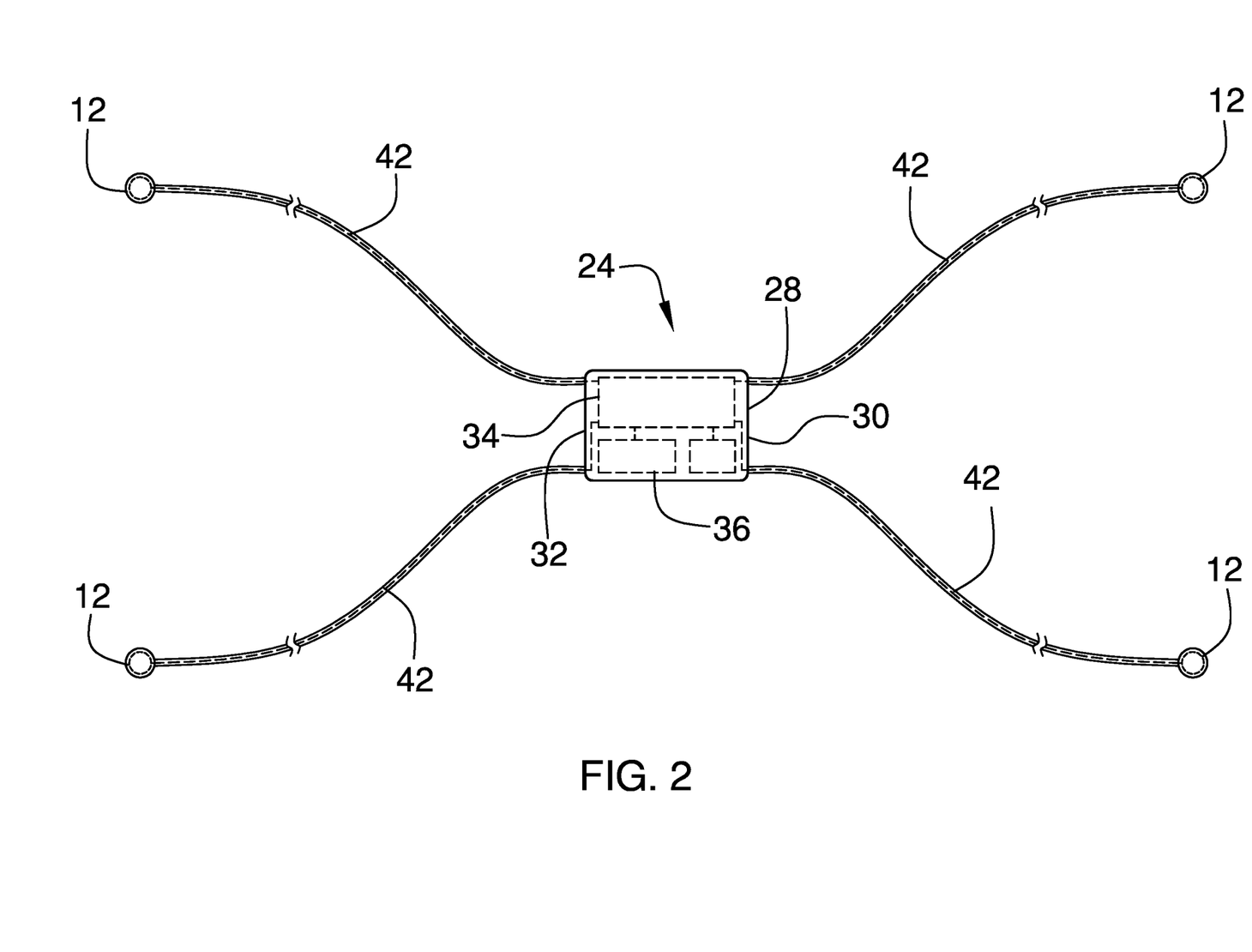
FIG. 2 is a top phantom view of an embodiment of the disclosure.

A plurality of conductors 42 is provided and each of the conductors 42 is coupled to and extends away from a respective one of the front wall 30 and the back wall 32 of the housing 28. Moreover, each of the conductors 42 is coupled to the perimeter wall 20 of a respective one of the load cells 12. In this way the conductors 42 facilitate each of the load cells 12 to be remotely positioned with respect to the housing 28. Each of the conductors 42 is electrically coupled to the respective load cell 12 and each of the conductors 42 is electrically coupled to the control circuit 34. In this way the conductors 42 communicate the weight data from the load cells 12 to the control circuit 34.

In use, each of the load cells 12 is positioned beneath a single object 14 or each of the load cells 12 is positioned beneath a respective one of a plurality of objects 14. In this way the load cells 12 measure the weight of the respective plurality of objects 14 or the singular object 14. The user employs the extrinsic electronic device 26 to view the weight measured by the load cells 12 from a remote location. In this way wireless communication is integrated into the weights and measurement industry in a manner that has been lacking in the past. The wireless connectivity of the load cells 12 to the personal electronic device 26 facilitates the load cells 12 to be employed in any conceivable environment.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A wireless scale assembly for measuring the weight of an object and broadcasting the measured weight to a personal electronic device for archival purposes, said assembly comprising:

a plurality of load cells, each of said load cells being positionable beneath an object to be weighed wherein each of said load cells is configured to measure the weight of the object, each of said load cells having a top wall, a bottom wall and a perimeter wall extending therebetween; and a processing unit being in electrical communication with each of said load cells thereby facilitating said processing unit receive weight data from each of said load cells, said processing unit being remotely positioned with respect to each of said load cells, said processing unit being in wireless communication with an extrinsic electronic device, said processing unit communicating the weight data to said extrinsic electronic device thereby facilitating said extrinsic electronic device to store the weight data wherein said extrinsic electronic device is configured to facilitate a user to read the weight recorded by each of said load cells, said processing unit comprising a housing having a front wall and a back wall, a control circuit being positioned within said housing, said control circuit being in electrical communication with each of said load cells, and a plurality of conductors, each of said conductors being coupled to and extending away from a respective one of said front wall and said back wall of said housing adjacent to a respective side of said housing, each of said conductors being coupled to said perimeter wall of a respective one of said load cells whereby each of said load cells is selectively positionable with respect to said housing with said top wall of each load cell being unobstructed wherein said top wall of each said load cell is configured for positioning directly under the object, each of said conductors being electrically coupled to said respective load cell, each of said conductors being electrically coupled to said control circuit for communicating the weight data from said load cells to said control circuit.

2. The assembly according to claim 1, wherein each of said load cells has a top wall, a bottom wall and a perimeter wall extending therebetween, said perimeter wall being continuously arcuate about a center point of said top wall such that each of said load cells has a disk shape, said bottom wall of each of load cells being positionable on a support surface thereby facilitating said top wall to have the object positioned thereon, said top wall of each of said load cells being movable with respect to said perimeter wall wherein said top wall of each of load cells is configured to be displaced by the weight of the object.

3. The assembly according to claim 1, wherein said processing unit includes a signal analyzer being positioned within said housing, said signal analyzer being electrically coupled to said control circuit such that said signal analyzer receives the weight data from each of said load cells thereby facilitating said signal analyzer to analyze the weight data from each of said load cells wherein said signal analyzer is configured to determine the weight of the object positioned on said load cells.

4. The assembly according to claim 3, wherein said processing unit includes a transceiver being positioned within said housing, said transceiver being electrically coupled to said control circuit, said transceiver being in wireless communication with said extrinsic electronic device, said transceiver broadcasting the weight determined by said signal analyzer to said extrinsic electronic device for communicating the weight to the user.

5. The assembly according to claim 1, wherein said processing unit includes a power supply being positioned in said housing, said power supply being electrically coupled to said control circuit, said power supply comprising at least one battery.

6. A wireless scale assembly for measuring the weight of an object and broadcasting the measured weight to a personal electronic device for archival purposes, said assembly comprising:
  a plurality of load cells, each of said load cells being positionable beneath an object to be weighed wherein each of said load cells is configured to measure the weight of the object, each of said load cells having a top wall, a bottom wall and a perimeter wall extending therebetween, said perimeter wall being continuously arcuate about a center point of said top wall such that each of said load cells has a disk shape, said bottom wall of each of load cells being positionable on a support surface thereby facilitating said top wall to have the object positioned thereon, said top wall of each of said load cells being movable with respect to said perimeter wall wherein said top wall of each of load cells is configured to be displaced by the weight of the object;
  a processing unit being in electrical communication with each of said load cells thereby facilitating said processing unit receive weight data from each of said load cells, said processing unit being remotely positioned with respect to each of said load cells, said processing unit being in wireless communication with an extrinsic electronic device, said processing unit communicating the weight data to said extrinsic electronic device thereby facilitating said extrinsic electronic device to store the weight data wherein said extrinsic electronic device is configured to facilitate a user to read the weight recorded by each of said load cells, said processing unit comprising:
  a housing having a front wall and a back wall;
  a control circuit being positioned within said housing, said control circuit being in electrical communication with each of said load cells;
  a signal analyzer being positioned within said housing, said signal analyzer being electrically coupled to said control circuit such that said signal analyzer receives the weight data from each of said load cells thereby facilitating said signal analyzer to analyze the weight data from each of said load cells wherein said signal analyzer is configured to determine the weight of the object positioned on said load cells;
  a transceiver being positioned within said housing, said transceiver being electrically coupled to said control circuit, said transceiver being in wireless communication with said extrinsic electronic device, said transceiver broadcasting the weight determined by said signal analyzer to said extrinsic electronic device for communicating the weight to the user; and
  a power supply being positioned in said housing, said power supply being electrically coupled to said control circuit, said power supply comprising at least one battery; and
  a plurality of conductors, each of said conductors being coupled to and extending away from a respective one of said front wall and said back wall of said housing adjacent to a respective side of said housing, each of said conductors being coupled to said perimeter wall of a respective one of said load cells whereby each of said load cells is selectively positionable with respect to said housing with said top wall of each load cell being unobstructed wherein said top wall of each said load cell is configured for positioning directly under the object, each of said conductors being electrically coupled to said respective load cell, each of said conductors being electrically coupled to said control circuit for communicating the weight data from said load cells to said control circuit.

* * * * *